(12) United States Patent
Sheehy et al.

(10) Patent No.: US 10,077,393 B2
(45) Date of Patent: Sep. 18, 2018

(54) BIOLOGICAL AUGMENTATION OF LOW SALINITY WATER FLOODING TO IMPROVE OIL RELEASE USING NUTRIENT SUPPLEMENTATION OF INJECTED LOW SALINITY WATER

(71) Applicant: TITAN OIL RECOVERY, INC., Beverly Hills, CA (US)

(72) Inventors: Alan James Sheehy, Minyama (AU); Bradley Ray Govreau, Spring, TX (US); Colin Kenneth Hill, San Dimas, CA (US); Michael Thomas Carroll, Glendora, CA (US); Brian W. G. Marcotte, Rolling Hills, CA (US)

(73) Assignee: Titan Oil Recovery, Inc., Beverly Hills, CA (US)

( * ) Notice: Subject to any disclaimer, the term of this patent is extended or adjusted under 35 U.S.C. 154(b) by 308 days.

(21) Appl. No.: 14/307,133

(22) Filed: Jun. 17, 2014

(65) Prior Publication Data

US 2014/0367090 A1 Dec. 18, 2014

Related U.S. Application Data

(60) Provisional application No. 61/836,313, filed on Jun. 18, 2013.

(51) Int. Cl.
*E21B 43/16* (2006.01)
*C09K 8/582* (2006.01)
*E21B 43/26* (2006.01)
*C09K 8/60* (2006.01)

(52) U.S. Cl.
CPC ............... *C09K 8/582* (2013.01); *C09K 8/60* (2013.01); *E21B 43/16* (2013.01); *E21B 43/26* (2013.01)

(58) Field of Classification Search
CPC .......... E21B 43/16; E21B 47/06; E21B 43/26; E21B 43/14; E21B 43/267
USPC ........ 166/250.01, 250.02, 252.3, 252.5, 263, 166/305.1
See application file for complete search history.

(56) References Cited

U.S. PATENT DOCUMENTS

| | | | |
|---|---|---|---|
| 4,971,151 A * | 11/1990 | Sheehy | .......................... 166/246 |
| 5,480,549 A | 1/1996 | Looney et al. | |
| 6,613,720 B1 * | 9/2003 | Feraud et al. | ................ 507/200 |
| 2001/0045279 A1 | 11/2001 | Converse et al. | |
| 2007/0251145 A1 | 11/2007 | Larter et al. | |
| 2007/0251146 A1 | 11/2007 | Larter et al. | |
| 2011/0067856 A1 | 3/2011 | Kohr | |

(Continued)

OTHER PUBLICATIONS

European Office Action, "Communication Pursuant to Article 94(3) EPC" by the Examiner from European Patent Office in Munich, Germany, for European Application No. 14813826.6, dated Dec. 12, 2017, 7 pages.

*Primary Examiner* — Silvana C Runyan
(74) *Attorney, Agent, or Firm* — Zarley Law Firm, P.L.C.

(57) ABSTRACT

A method of enhancing oil recovery includes the step of determining a specific nutrient package used to initiate a microbiological response under actual reservoir conditions in combination with low salinity water injection. Once determined, the specific nutrient package is applied to at least one targeted well to stimulate resident microorganisms such that size or hydrophobic properties are beneficially altered so that interaction with oil contained in a reservoir rock formation is improved.

12 Claims, 4 Drawing Sheets

(56) References Cited

U.S. PATENT DOCUMENTS

2012/0214713 A1 8/2012 Mu et al.
2012/0273189 A1* 11/2012 Alsop et al. ............ 166/246

* cited by examiner

BIOLOGICAL AUGMENTATION OF LOW SALINITY WATER FLOODING TO IMPROVE OIL RELEASE USING NUTRIENT SUPPLEMENTATION OF INJECTED LOW SALINITY WATER

CROSS REFERENCE TO RELATED APPLICATION

This application claims the benefit of U.S. Provisional Application No. 61/836,313 filed Jun. 18, 2013.

BACKGROUND OF THE INVENTION

A number of petroleum, reservoirs naturally contain low salinity water. Additionally low salinity water injection is a technique utilized in secondary and tertiary oil recovery that has been found to increase recovery of oil from the reservoir. This invention relates to the augmentation of the low salinity water injection process, by utilizing nutrient supplementation of resident microorganisms in the geologic oil formation assisting in oil recovery and thereby improving oil production rate and estimated ultimate recovery (EUR) from the oil reservoir. The addition of nutrients causes resident microorganisms to become interactive with the oil in the oil reservoir causing changes to the wettability or permeability relative to oil in the subsurface oil field reservoirs. More particularly this invention contemplates a method of manipulating resident microorganisms in an oil reservoir to increase the recovery of oil through the addition of liquid nutrients to low salinity water prior to its injection into a water flooded reservoir.

An objective of the present invention is to provide a method of enhancing oil recovery of low salinity water flooding.

An objective of the present invention is to provide a method of oil recovery by causing changes in wettability or fluid relative permeability.

These and other objectives will be apparent to one of ordinary skill in the art based upon the following written description, drawing, and claims.

SUMMARY OF THE INVENTION

A method of enhancing oil recovery includes the step of determining a specific nutrient package used to initiate a microbiological response under actual reservoir conditions in combination with low salinity water injection. Once determined, the specific nutrient package is applied to a targeted well to stimulate resident microorganisms such that size or hydrophobic properties are beneficially altered so that interaction with oil contained in a reservoir rock formation is improved.

The application of the specific nutrient package may occur cyclically or periodically and simultaneously with a low salinity water injection. The specific nutrient package causes the resident microorganisms to interact with oil in the reservoir to cause changes in wettability or fluid relative permeability.

DETAILED DESCRIPTION OF PREFERRED EMBODIMENTS

Figure 1:
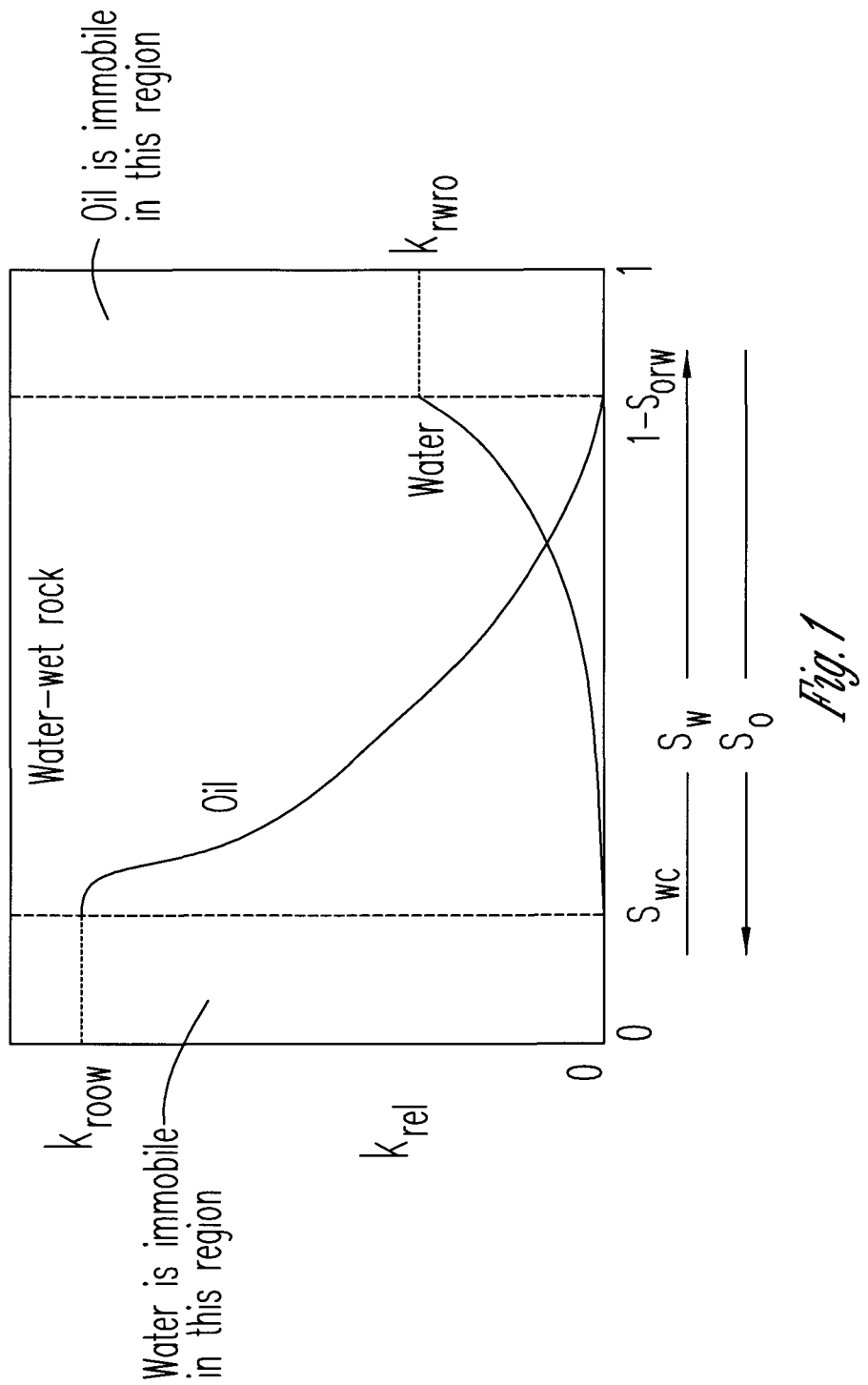
FIG. 1 is a chart of a water layer of a method of enhancing oil recovery.
Figure 2:
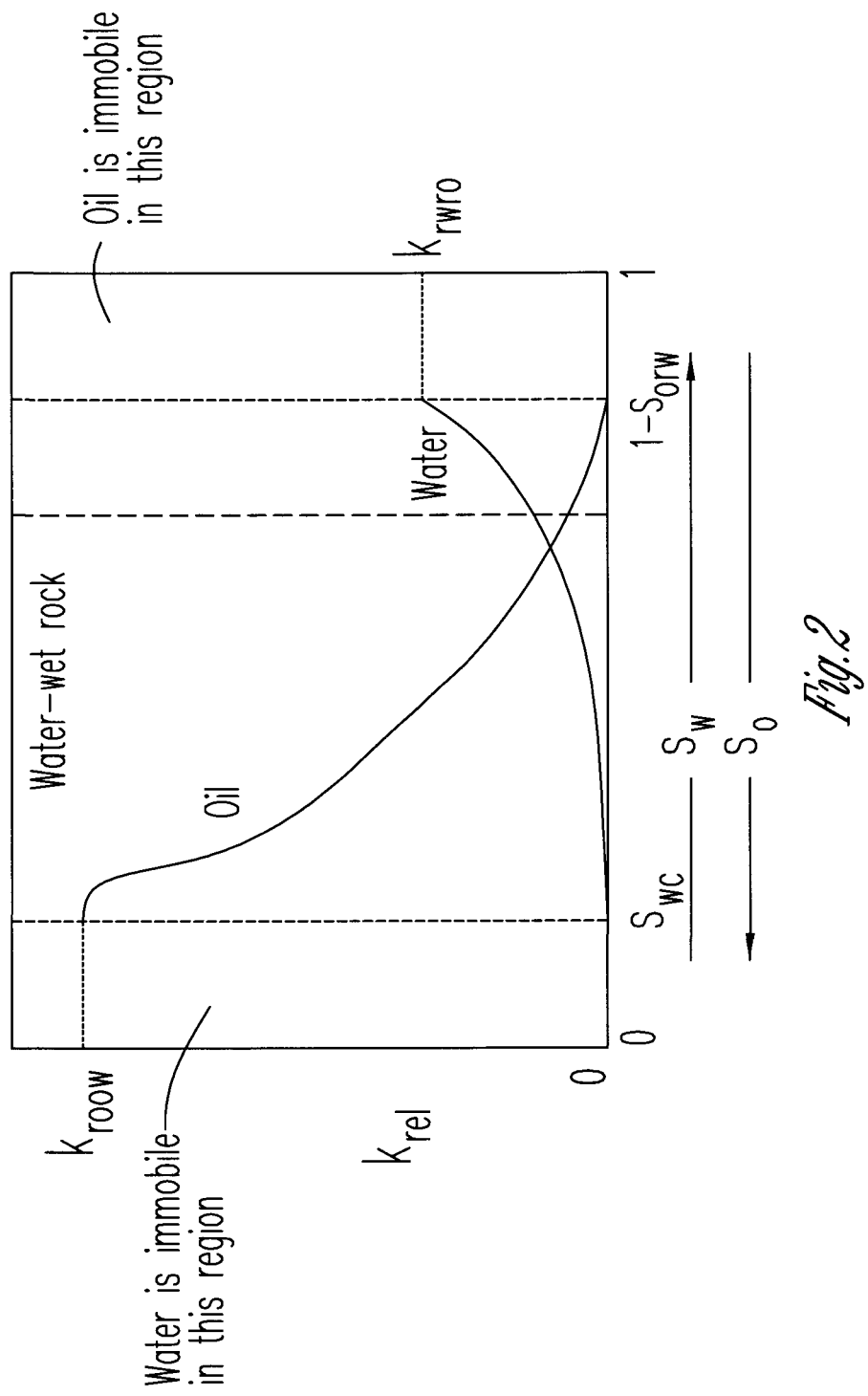
FIG. 2 is a chart of relative permeability of a method of enhancing oil recovery.
Figure 3:
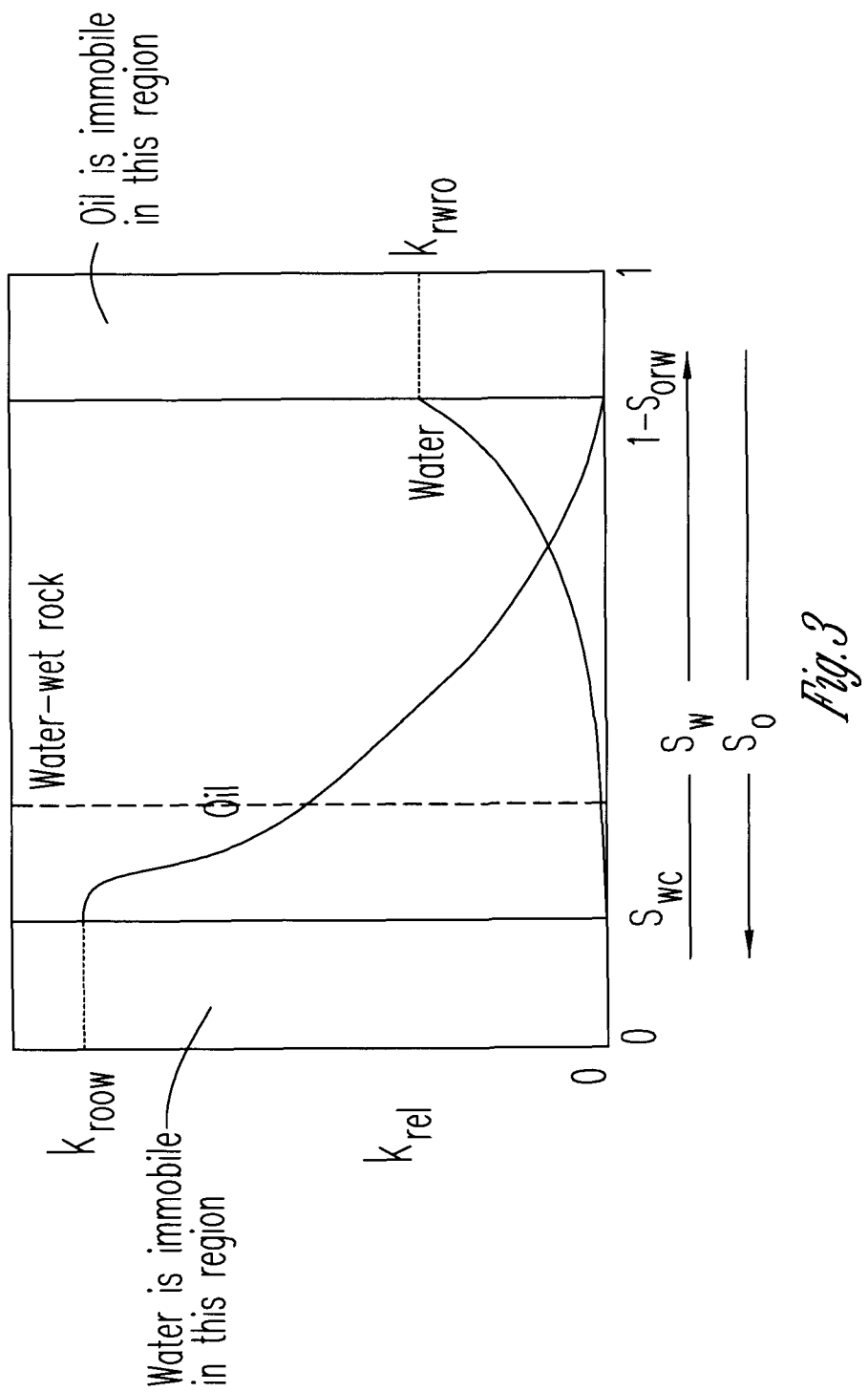
FIG. 3 is a chart of oil release shifts of a method of enhancing oil recovery.
Figure 4:
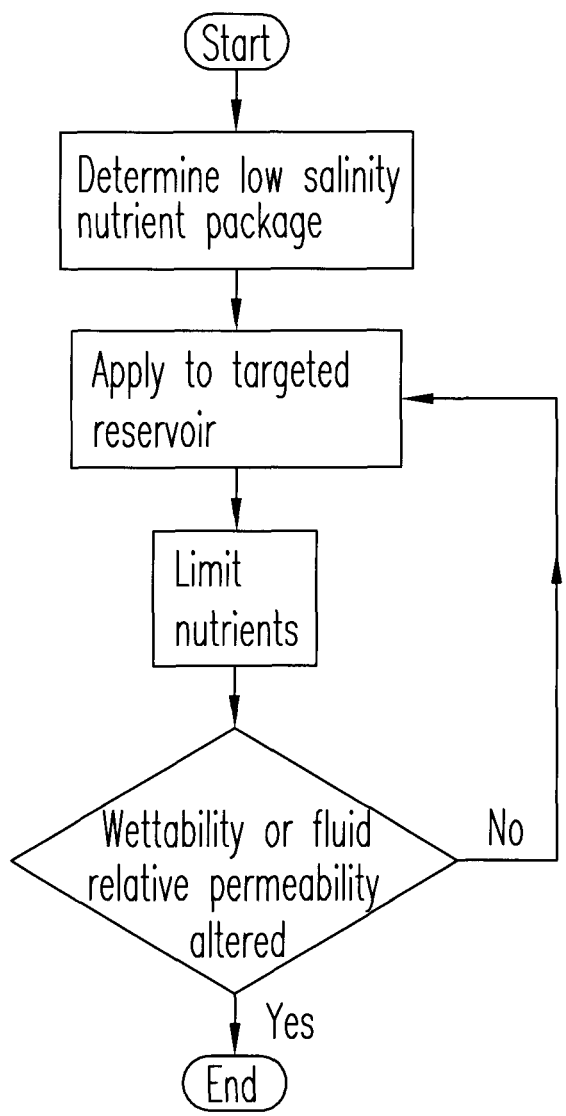
FIG. 4 is a flow diagram of a method of enhancing oil recovery.

A method of nutrient supplementation followed by limitation is used to enhance the oil releasing characteristics of resident microorganisms found in oil reservoirs under low salinity water flood.

The microorganisms occur either in the natural oil reservoir or source through the injected water. The injection of lower salinity water may change the concentration of microorganisms. Nutrient supplementation will optimize the effect of lower salinity water injection occupying a part of the reservoir pore space or fracture system(s) or a combination of both.

The method includes taking a sample of fluids from a target well, performing laboratory analyses and then increasing and enhancing the oil releasing characteristics of resident microorganisms by applying a specific nutrient formula based upon the laboratory analyses to stimulate the resident microorganisms such that size or hydrophobic properties are beneficially altered so that interaction with the oil contained in the reservoir rock formation is improved. Treatment with the specific nutrient package is uniquely performed on a cyclic or periodic basis and at the same time as continuous low salinity water injection.

The step of stimulation of resident microorganisms is followed by nutrient management which starts a process that enhances the oil recovery. In one embodiment, this change in the microorganisms includes those having surface-active properties brought about by the specific changes in physiology noted above.

Certain nutrient formulations have been shown to be highly effective in releasing oil in oil reservoirs that have low salinity water in multiple field treatments. This same characteristic response may be used to enhance low salinity water injection processes.

The step of stimulation and subsequent modification of resident microorganisms is performed to a sufficient level that the surface active properties increase, thereby enhancing oil recovery through related improvements in wettability or relative permeability. The mechanism influencing oil release and the subsequent effect on relative permeability are conceptually presented in Table 1.

Preferably a specific package of nutrients, not derived from sugars, is used.

In one embodiment, a nutrient package is formulated and applied that creates specific desired microbial activity in induced low salinity systems.

The nutrient package may suppress some undesirable microorganisms while stimulating desirable microorganisms.

The nutrient package is preferably prepared in a liquid form compatible with and to improve the performance of low salinity water flood processes.

Delivery of the nutrient package may occur via water injection wells to administer the nutrient package into low salinity water injection systems.

A series of laboratory analyses are performed that lead to formulation of a specific nutrient package used to initiate a microbiological response analysis under actual reservoir conditions in combination with low salinity water injection. One embodiment of the invention contemplates the introduction of a specific package of nutrients in a liquid form that can be diluted to produce a range of concentrations from 100 grams per liter to 0.0001 grams per liter in the treated volume. Specific packages of nutrients facilitate microbe-mediated oil release in reservoirs where microbiological life occurs.

In one embodiment the invention contemplates the use of a genetic analysis of microorganisms to aid in the determination of the presence of oil interactive microorganisms that have the specific functions described earlier in the presence of low salinity water flood treatments.

Definitions:

"Low Salinity Water Injection" involves injecting brine with a lower salt content or ionic strength than the commingled natural formation water and historical injection water. Low salt content is typically in the range of 500-3,000 parts per million of total dissolved solids, and more generally less than 5,000 parts per million. This can be compared with salinities of seawater or formation water, which are generally 30,000 ppm or higher. The introduction of low salinity water in an equilibrium system of high salinity appears to cause a shift to a new system equilibrium, which tends to favor improved oil recovery. (From Statoil, Low-salinity water (LSW) flooding)

"Wettability" is described as the adhesion tension, which is a function of the interfacial tension, and determines which fluid (oil or water) will preferentially wet (adhere to) the solid surface of the reservoir rock. If the adhesion tension is large, the denser phase liquid will readily spread out and tend to coat the surface of the reservoir rock. If the adhesion tension is small, the denser fluid will only be weakly attracted to the surface. By changing the reactive character from oil-wet to water-wet, oil will flow more freely rather than being attracted to the rock surface. (Amyx, Bass and Whiting, Petroleum Engineering Principles, McGraw-Hill, 1960)

"Permeability" is a property of the rock and not the fluid that flows through it, provided that the fluid 100% saturates the pore space of the rock. This permeability at 100% saturation is called the absolute permeability of the rock. When two fluids such as oil and water occupy the pore space in specific saturation values then the relative permeability to water and oil is $$k_{rw} = \frac{q_w u_w L}{A(P_1 - P_2)}$$

where $k_{rw}$=relative permeability to water at a given saturation $(S_w)$
$q_w$=water flow rate
$u_w$=viscosity of water
L=length of a reservoir rock core sample
A=cross sectional area of the core sample
$P_1$=Upstream pressure
$P_2$=Downstream pressure $$K_{ro} = \frac{q_o u_o L}{A(P_1 - P_2)}$$

where $k_{ro}$=relatively permeability to oil at a given saturation $(S_o)$ where $(S_o+S_w)$=100%
$q_{ro}$=oil flow rate
$u_o$=viscosity of oil
L=length of reservoir rock core sample
A=cross sectional area of the core sample
$P_1$=Upstream pressure
$P_2$=Downstream pressure
(Craft and Hawkins, Applied Petroleum Reservoir Engineering, Prentice Hall, 1959)

"Resident Microorganisms" are defined as microorganisms that occur in oil reservoirs, prior to the envisioned treatment, irrespective of the microorganism's origin or where they occur within the oil-bearing strata.

What is claimed:

1. A method for enhancing oil recovery, comprising the steps of:
   determining a specific nutrient package used to initiate a microbiological response under actual reservoir conditions in combination with low salinity water injection;
   applying the specific nutrient package to at least one targeted well to stimulate resident microorganisms to alter hydrophobic properties so that interaction with oil contained in a reservoir rock formation is improved and optimize an effect of lower salinity water injection.

2. The method of claim 1 wherein the step of applying the specific nutrient package occurs simultaneously with a low salinity water injection.

3. The method of claim 1 wherein the step of applying the specific nutrient package occurs cyclically.

4. The method of claim 1 wherein the step of applying the specific nutrient package occurs periodically.

5. The method of claim 1 wherein the specific nutrient package causes the resident microorganisms to interact with oil in the reservoir to cause changes in wettability.

6. The method of claim 1 wherein the specific nutrient package causes the resident microorganisms to interact with oil in the reservoir to cause changes in relative fluid permeability.

7. The method of claim 1 wherein the application of the specific nutrient package is selected from a group consisting of simultaneously cyclical, and periodically with a low salinity water injection.

8. The method of claim 1 wherein the specific nutrient package is determined from a series of laboratory analyses.

9. The method of claim 1 further comprising the step of conducting a genetic analysis of the resident microorganisms.

10. The method of claim 1 wherein the specific nutrient package is not derived from sugars.

11. The method of claim 1 wherein the step of applying the specific nutrient package to at least one targeted well are diluted to produce a range of concentrations from 0.0001 grams per liter to 100 grams per liter in a treated volume.

12. The method of claim 1 wherein the specific nutrient package causes the resident microorganisms to interact with oil in the reservoir to cause changes to the relative oil and water saturation in the pores of the reservoir.

* * * * *